United States Patent
Dain (10) Patent No.: US 9,765,226 B2
(45) Date of Patent: Sep. 19, 2017

(54) ULTRAVIOLET PRINTING WITH LUMINOSITY CONTROL

(71) Applicant: Disney Enterprises, Inc., Burbank, CA (US)

(72) Inventor: Susan Dain, Montrose, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/227,339

(22) Filed: Mar. 27, 2014

(65) Prior Publication Data

US 2015/0274995 A1    Oct. 1, 2015

(51) Int. Cl.
| | | |
|---|---|---|
| C09D 11/03 | (2014.01) | |
| C09D 11/16 | (2014.01) | |
| C09D 11/17 | (2014.01) | |
| C09D 11/38 | (2014.01) | |
| C09D 11/50 | (2014.01) | |
| B42D 25/00 | (2014.01) | |
| B42D 25/387 | (2014.01) | |
| C09D 11/02 | (2014.01) | |
| C09D 11/30 | (2014.01) | |

(52) U.S. Cl.
CPC ............ *C09D 11/02* (2013.01); *C09D 11/03* (2013.01); *C09D 11/30* (2013.01); *C09D 11/38* (2013.01); *Y10T 428/24802* (2015.01); *Y10T 428/24934* (2015.01)

(58) Field of Classification Search
None
See application file for complete search history.

(56) References Cited

U.S. PATENT DOCUMENTS

| | | | | |
|---|---|---|---|---|
| 6,337,362 | B1* | 1/2002 | Reynolds | B82Y 30/00 106/419 |
| 7,470,731 | B2* | 12/2008 | Sanchez | C09D 11/322 523/160 |
| 2003/0183695 | A1* | 10/2003 | Labrec et al. | 235/487 |
| 2005/0230960 | A1* | 10/2005 | Bilodeau | G09F 3/0292 283/75 |
| 2006/0249951 | A1* | 11/2006 | Cruikshank et al. | 283/92 |
| 2008/0074453 | A1* | 3/2008 | Furukawa | B41J 2/2142 347/14 |
| 2009/0286021 | A1* | 11/2009 | Kulibert | B41M 5/502 428/32.12 |
| 2012/0125228 | A1* | 5/2012 | Iftime | 106/31.14 |

* cited by examiner

*Primary Examiner* — Laura Powers
(74) *Attorney, Agent, or Firm* — Dorsey & Whitney LLP (57) ABSTRACT

Disclosed herein are printable compositions that include a UV-A blocking compound, wherein the composition is free of colorants that are visible under white light or UV light. Also disclosed herein are images formed by printing the printable composition on a substrate surface, wherein the substrate surface includes one or more Uv fluorescent materials on at least a portion thereof. Also disclosed herein are methods of forming an image on a substrate including printing a selected amount of the printable composition on top of a UV fluorescent material.

13 Claims, 7 Drawing Sheets

ULTRAVIOLET PRINTING WITH LUMINOSITY CONTROL

TECHNICAL FIELD

The invention generally relates to printing methods, printing systems, and images printed employing UV-A fluorescent inks; and, more particularly, to printing methods, printing systems, and images printed employing UV-A fluorescent inks with improved luminosity control.

BACKGROUND

Printable inks that fluoresce under ultraviolet A (UV-A, or black light) illumination, that is, ultraviolet light having wavelengths of 315-400 nm, are increasingly available in the market. Such inks are referred to herein as one example of "UV ink." Some UV inks are also visible when illuminated by white light, that is, light having wavelengths of 400-700 nm, and are referred to herein as "visible UV inks." Other UV inks have little or no color under white light illumination and are referred to herein as "invisible UV inks." Both visible UV inks and invisible UV inks can be used in combination with conventional white light visible inks, referred to herein as "visible inks" that do not fluoresce, thereby allowing the creation of images that can be seen in both standard white light and under UV-A illumination.

The huge variety of conventional visible inks and growing variety of UV inks and well understood mixing techniques give artists the ability to create spectacular effects such as invisible images, dual images, and day/night transitioning images. However, UV inks also present new artistic challenges.

Properties that affect the appearance of UV inks to the human eye include, like visible inks, hue (color) and saturation (value). The UV inks have the additional variability of luminosity. Luminosity with respect to UV inks generally refers to the amount of light emitted by the fluorescent particles in the UV ink when it is illuminated with UV-A light. For the most part UV inks are created to maximize luminosity as it is generally thought preferable to have the inks emit as much light as can be produced. Further, the color palette of UV inks is limited to what appears to be neon type colors due to the emissive nature of the inks.

The distinct lack of mid-range tones and color palette range available in known UV ink printing processes is caused by the lack of ability to control the luminosity of the color. As ever higher luminosity inks are developed, the images that can be produced with the inks remain limited by this lack of control. Controlling the luminosity allows the artist to create the illusion of depth. Currently, visible black ink is used to decrease luminosity of UV inks by covering up some portion of the UV ink imaged area, since black visible ink does not fluoresce and thus appears black under both visible and UV-A illumination. However, this approach suffers from the problem that the black ink also appears black in white light conditions, and thus darkens the appearance of the visible ink image. Unlike dye-based inks, black ink is pigmented, thus is opaque. The effect of an opacifying agent is to affect luminosity in a manner that does not enable mid-range tones or a full color palette.

Since visible black ink affects both UV luminosity and white light shading at the same time, the artist is forced to compromise the resultant image. It would be desirable to control luminosity of the UV inks and shading of the visible inks independently to enable the production of dual images with improved appearance.

An additional level of complication arises when printing with visible UV inks. In such cases, the appearance of the image as illuminated by white light is determined by the combination of visible UV ink and visible ink. Thus, once the visible color is selected, the UV-A luminosity of the image is fixed. If the artist desires to modify the UV-A luminosity, she may compromise the appearance of the image as illuminated by white light.

An illustration of this problem is provided by an artist who wants to make an image having light blue shading that fades to white, and wants that image be visible both in white light and UV-A light. Currently, to fade the UV blue ink the artist would add visible black (also visible as black under UV-A light) to reduce the luminosity. This only causes the image to fade to black. Further, the presence of visible black pigment ruins the fade-to-white present in the visible light image. Finally, since the presence of black pigment is visible in white light, UV ink images intended to be invisible in white light are not enabled on anything but a black background.

This problem is also manifested in the inability of the artist to provide the subtle mid-range tones required to give the illusion of depth in a two-dimensional printed image. Addition of mid-range tones to UV ink images would provide the artist with the ability to create the nuances and enable effective illusion of depth in printed images.

Accordingly, there is a need in the industry for printing systems, printing methods, and ink compositions that enable luminosity control in UV inks with minimal impact on the appearance of white light printed matter.

SUMMARY

Disclosed herein is a printable composition comprising a UV blocking compound, wherein the composition contains substantially no colorants visible under white light and substantially no colorants visible in at least a portion of the range of UV wavelengths blocked by the composition. In some embodiments, the composition is an inkjet ink. In some embodiments, the composition is waterbased, solvent based, or curable. In some embodiments, the composition is a flexographic ink. In some embodiments, the composition is a 3D printer filament. In some embodiments, the composition is a dye sublimation ink, wherein the UV blocking compound is stored on a polyester ribbon. In some embodiments, the composition is a laser toner.

Also disclosed herein is a printable composition comprising a mixture of two or more UV blocking compounds, wherein the UV blocking compounds are selected from UV-A, UV-B, and UV-C blocking compounds or mixtures or overlapping wavelength blocking ranges thereof, wherein the composition contains substantially no colorants visible under white light and substantially no colorants visible in at least a portion of the range of UV wavelengths blocked by the composition. In some embodiments, the composition is an inkjet ink. In some embodiments, the composition is waterbased, solvent based, or UV curable using a wavelength that does not correspond to the range of wavelengths blocked by the UV blocking compounds. In some embodiments, the composition is a flexographic ink. In some embodiments, the composition is a 3D printer filament. In some embodiments, the composition is a dye sublimation ink, wherein the UV blocking compounds are stored on a polyester ribbon. In some embodiments, the composition is a laser toner.

Also disclosed herein is an image formed by printing a printable composition on a substrate surface, the printable composition comprising a UV blocking compound, wherein the composition includes substantially no colorants visible under white light and substantially no colorants visible in at least a portion of the range of UV wavelengths blocked by the composition, the substrate surface comprising one or more UV fluorescent materials on at least a portion thereof. In some embodiments, the image is a monochromatic image with a full range of luminosity when illuminated by a selected range of UV radiation. In some embodiments, one or more visible inks are further printed on the substrate surface. In some embodiments, one or more UV inks are printed on the substrate surface. In some such embodiments, the UV ink is a visible UV ink. In some embodiments, the substrate comprises a sheet or film comprising paper, a thermoplastic polymer, or a combination thereof. In some embodiments, the image is a three dimensional image comprising two or more printed layers, wherein the substrate surface comprises one or more layers of the three dimensional image.

Also disclosed herein is an image formed by printing a printable composition on a substrate surface, the printable composition comprising a mixture of two or more UV blocking compounds, wherein the UV blocking compounds are selected from UV-A, UV-B, and UV-C blocking compounds or mixtures or overlapping wavelength blocking ranges thereof, wherein the composition contains substantially no colorants visible under white light and substantially no colorants visible in at least a portion of the range of UV wavelengths blocked by the composition, the substrate surface comprising one or more UV fluorescent materials on at least a portion thereof. In some embodiments, the image is a monochromatic image with a full range of luminosity when illuminated by the selected range of UV radiation wavelengths. In some embodiments, one or more visible inks are further printed on the substrate surface. In some embodiments, one or more UV visible inks are printed on the substrate surface. In some such embodiments, the UV ink is a visible UV ink. In some embodiments, the substrate comprises a sheet or film comprising paper, a thermoplastic polymer, or a combination thereof. In some embodiments, the image is a three dimensional image comprising two or more printed layers, wherein the substrate surface comprises one or more layers of the three dimensional image.

Also disclosed herein is a method of forming an image on a substrate comprising printing a selected amount of a printable composition on top of a UV fluorescent material, wherein the printable composition comprises a UV blocking compound and substantially no colorants visible under white light and substantially no colorants visible in at least a portion of the range of UV wavelengths blocked by the composition. In some embodiments, the printing is accomplished by inkjet printing, flexographic printing, thermal wax transfer printing, dye sublimation printing, 3D printing, or laser printing. In some embodiments, the printing is accomplished by drop-on-demand inkjet printing. In some embodiments, the UV fluorescent material is a UV ink, the UV ink printed using the same printing method as the printable composition. In some embodiments, the method further comprises printing a visible ink image on the substrate, the visible ink printed using the same printing method as the printable composition. In some embodiments, the substrate comprises a sheet or film comprising paper, a thermoplastic polymer, or a combination thereof.

Also disclosed herein is a method of forming an image on a substrate comprising printing a selected amount of a printable composition on top of a UV fluorescent material, the UV fluorescent material including one or more materials that fluoresce when irradiated by one or more of UV-A, UV-B, and UV-C radiation, wherein the printable composition comprises a printable composition comprising a mixture of two or more UV blocking compounds, wherein the UV blocking compounds are selected from UV-A, UV-B, and UV-C blocking compounds or mixtures or overlapping wavelength blocking ranges thereof, wherein the composition contains substantially no colorants visible under white light and substantially no colorants visible in at least a portion of the range of UV wavelengths blocked by the composition. In some embodiments, the printing is accomplished by inkjet printing, flexographic printing, thermal wax transfer printing, dye sublimation printing, 3D printing, or laser printing. In some embodiments, the printing is accomplished by drop-on-demand inkjet printing. In some embodiments, the UV fluorescent material is a UV ink, the UV ink printed using the same printing method as the printable composition. In some embodiments, the method further comprises printing a visible ink image on the substrate, the visible ink printed using the same printing method as the printable composition. In some embodiments, the substrate comprises a sheet or film comprising paper, a thermoplastic polymer, or a combination thereof.

Additional embodiments as described are described below, wherein all such embodiments are intended to be used individually or in any combination thereof. Further, additional advantages and novel features as described will become apparent to those skilled in the art upon examination of the following, or may be learned through routine experimentation upon practice. Reference to various embodiments does not limit the scope of the claims attached hereto. Additionally, any examples set forth in this specification are not intended to be limiting and merely set forth some of the many possible embodiments for the appended claims.

DETAILED DESCRIPTION

As used herein, "UV radiation" or "UV light" means radiation having wavelength range between 100-400 nm. UV radiation includes one or more of UV-A radiation, UV-B radiation, UV-C radiation, or an overlapping range thereof. UV-A radiation is ultraviolet light having wavelengths of 315-400 nm. UV-B radiation is ultraviolet light having wavelengths of 280-315 nm. UV-C radiation is ultraviolet light having wavelengths of 100-280 nm.

As used herein, "UV ink" means a printable material that fluoresces under UV radiation. In some embodiments, the UV ink fluoresces under UV-A radiation. In other embodiments, as determined by context, the UV ink is a printable material that fluoresces under UV-A, UV-B, or UV-C radiation, or a combination of two or more thereof or an overlapping range thereof.

As used herein, "visible UV ink" means a UV ink that is also visible when illuminated by white light, that is, light having wavelengths of 400-700 nm. As used herein, "invisible UV ink" means a UV ink that is invisible when illuminated by white light.

As used herein, "visible ink" means a printable material that is visible in white light but not UV light.

As used herein, "visible" means detectible by the eye of an average human. As used herein, "invisible" means not detectible by the eye of an average human, or slightly visible to the eye of an average human such that visibility is perceived as shading or a difference in surface texture.

As used herein, "colorant" means a dye or a pigment or both, as determined by context.

As used herein, "UV blocking ink" means a printable composition including a UV blocking compound.

As used herein, "UV blocking compound" is a compound or blend of compounds that blocks UV radiation by absorption or reflection/scattering. The UV radiation blocked by the UV blocking compound is determined by the compound structure and form (e.g. nanoparticulate vs. soluble molecules) and is selected by the user to block a desired range of UV wavelengths.

As used herein, the word "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property thereof, a measurable quantity or property of a composition, image, or method of the invention or like values, and ranges thereof, employed in describing the embodiments of the disclosure, refers to variation in the type or amount of materials included in compositions, physical properties of the compositions, images formed using the compositions including physical properties of the images, or methods of using the compositions or images, that do not affect the overall properties thereof in a manner that negates an intended property. Intended properties include, solely by way of nonlimiting examples thereof, concentration, viscosity, luminosity, fluorescence, wavelength, color palette, hue, saturation, visibility, and the like. The effect on properties that are modified by "substantially" include the effects caused by any type or amount of materials in a formulation to one or more properties of a composition, a method of use, or an image, wherein the manner or degree of the effect does not negate one or more intended properties; and like proximate considerations. Where modified by the term "substantially" the claims appended hereto include equivalents to these types and amounts of materials.

The compositions as described are printable compositions that contain compounds that block UV radiation by absorption or reflection/scattering, are invisible or nearly invisible to white light, and contain substantially no visible colorants and substantially no UV fluorescing colorants that fluoresce when irradiated by a selected range of UV wavelengths. Such printable compositions are referred to herein as "UV blocking inks." In some embodiments, the UV blocking ink is a UV-A blocking ink. We have found that the use of UV blocking ink, printed using conventional print methodology, imparts an effective range of luminosity when printed in conjunction with UV fluorescent surfaces, while the UV blocking ink remains invisible in white light. Use of the UV-A blocking inks as described herein enables the formation, for example, of mid-range tones in UV-A fluorescent images (that is, UV-A fluorescent inks printed on a substrate, or a UV-A fluorescent substrate) by printing a selected pattern or amount of UV-A blocking ink over a UV-A fluorescent ink image or on a substrate that is UV-A fluorescent. Similarly, printing a selected pattern or amount of UV-B blocking ink over the UV-B fluorescent ink image or on a substrate that is UV-B fluorescent enables the formation of mid-range tones in UV-B fluorescent images. Similarly, printing a selected pattern or amount of UV-C blocking ink over the UV-C fluorescent ink image or on a substrate that is UV-C fluorescent enables the formation of mid-range tones in UV-C fluorescent images. Combinations of UV-A, UV-B, and UV-C blocking inks, fluorescent inks, and fluorescent substrates are similarly envisioned and are not limited by the disclosures herein.

Subsequent discussion herein focusing on UV-A blocking inks, UV-A fluorescent inks, and UV-A fluorescent substrates are not limiting and are intended to be merely representative of the range of possible embodiments of the invention. Embodiments wherein "UV-A" is replaced with "UV-B", "UV-C", or "a combination of one or more of UV-A, UV-B, or UV-C or an overlapping wavelength range of two or more thereof" is equally disclosed herein and envisioned as within the scope of the invention.

Using modern printing methodology, a selected portion of UV-A fluorescence is prevented under UV-A irradiation, because the UV-A fluorescent material is unable to absorb UV-A radiation where the UV blocking compound prevents the radiation from reaching the fluorescent material. In some such embodiments, a UV blocking ink is deposited on top of the UV-A fluorescent material, while in other embodiments the UV blocking ink is deposited along with a UV ink in a manner that provides for some amount of mixing of the inks. In a single printed UV ink dot, for example, the UV ink is covered by, or mixed with, some amount of the UV blocking ink. A greater amount of UV blocking ink deposited on the dot location results in a lower amount of fluorescence by the UV ink when the dot is illuminated with UV-A radiation. Additionally, the UV blocking ink may be positioned adjacent to but not overlapping the UV ink. In this configuration, the UV blocking ink may absorb some of the fluorescence of the adjacent UV ink and affect the visible appearance for the intended effect. By controlling the amount of UV-A blocking compound deposited in a particular location, a full range of luminosity is achieved in UV ink images.

The use of modern printing techniques in conjunction with the UV blocking inks provide a high degree of artistic image control that is advantageous to the production of effective white light invisible images, dual white light/UV-A light images, and day/night transitioning images on any color substrate, including white. The full range of luminosity control, which is imparted to any UV ink image or UV-A fluorescent material, is analogous to a photographic grayscale range using many conventional printing techniques. Effects such as fading, shadows, and illusion of depth are easily obtained in UV ink images using the materials and methods described herein, yet the UV blocking inks are not visible when illuminated by white light. Control of deposition of inks is a hallmark of modern printing techniques. Variable amounts of UV blocking ink are easily applied using modern printing methods to mix with, cover, or be placed adjacent to UV-A fluorescent materials using, for example, raster image processing by a computer and the selected digital imaging method; or even by methods such as flexographic printing.

The selected method of printing determines how a UV blocking ink is formulated. The printing methods useful in conjunction with a UV blocking ink are not particularly limited, and one of skill will appreciate that the use of a UV blocking ink can extend to nearly any printing methodology wherein the UV-A blocking compound is usefully provided as a separate printable composition. Examples of printing methods usefully employed in conjunction with the UV blocking inks include inkjet printing, flexographic printing, thermal wax transfer printing, dye sublimation printing, 3D printing, and laser printing.

A UV blocking ink as described includes at least a UV blocking compound and an ink medium, wherein the ink medium serves to work with the selected printing method to deliver the UV blocking compound onto the intended substrate. UV blocking compounds including UV-A blocking compounds, UV-B blocking compounds, UV-C blocking compounds, blends thereof, and compounds and blends thereof that block various ranges of UV radiation wavelengths are usefully employed in the UV blocking ink compositions. UV blocking compounds usefully employed in one or more UV blocking inks include various derivatives of hydroxyphenylbenzotriazole, hydroxybenzophenone, cinnamic acid, salicyclic acid, hydroxyphenyl-s-triazine, and axalanilides; avobenzone, bis-ethylhexyloxyphenol methoxyphenyl triazine (sold under the trade name TINOSORB® S by the BASF Corporation of Florham Park, N.J.), methylene bis-benzotriazolyl tetramethylbutylphenol (sold under the trade name TINOSORB® M by the BASF Corporation), terephthalylidene dicamphor sulfonic acid (sold under the trade name MEXORYL® SX by the L'Oréal Group of Clichy, Hauts-de-Seine, France), drometrizole trisiloxane (sold under the trade name MEXORYL® XL by the L'Oreal Group), hexyl 2-[4-(diethylamino)-2-hydroxybenzoyl]benzoate (sold under the trade name UVINUL® A PLUS by the BASF Corporation), ethylhexyl methoxycinnamate, p-aminobenzoic acid (PABA), 2-ethylhexyl 4-(dimethylamino)benzoate (padimate O), phenylbenzimidazole sulfonic acid, and microparticles and/or nanoparticles including titanium dioxide, silicon dioxide, or zinc oxide, and the like.

It will be appreciated that not every UV blocking compound is suitable for every UV blocking ink composition. For example, some UV blocking compounds may not be stable at high temperatures or in certain solvents whereas some printing techniques employ higher temperatures (such as dye sublimation or thermal inkjet) or solvents (such as continuous inkjet printing) that render one or more UV blocking agents unstable. One of skill will understand that is necessary to employ a UV blocking compound that is stable under the selected printing conditions, forms a stable ink composition that does not e.g. precipitate readily in the case of a liquid ink, does not react unintentionally with the components of the ink medium, and can be suitably formulated to form an ink suitable for the selected print technique, for deposition on the selected printing substrate, and for blocking the selected range of UV radiation wavelengths for the particular application.

A wide range of print substrates are conveniently and easily addressed by printing methods as described. The substrates printable employing the UV blocking inks as described are not particularly limited. Examples of substrates usefully printed include coated and uncoated papers, paperboard, and corrugated board, foils and metallized films or papers, and a wide range of thermoplastic films and sheets formed, in some embodiments, from polyethylene, polypropylene, polyester, polyvinyl chloride, polyvinylidene chloride, nylon, and the like including blends thereof and multilayer films using two or more thereof. In some embodiments, the substrates are coated with a specialized coating adapted to receive a particular type of ink; for example, thermoplastic sheets often have a water-absorptive coating thereon for use with waterbased inkjet inks. Small format printing, such as for letter size paper or labels, as well as large format printing is usefully carried out using known print technologies in conjunction with the UV blocking inks as described.

Large format printing includes films and sheets, in some embodiments with an adhesive backing, for use as murals, posters, amusement park ride parts, including covers of compartments or displays on the inside thereof, advertisement or decorative adhesive "wraps" for vehicles such as cars, vans, buses, and the like. In some embodiments where the substrate is intended to cover a window, windshield, or other transparent area, a portion or the entirety of the substrate area for covering the transparent area is perforated. In some such embodiments, the back side surface of the substrate includes a black or gray pigment so that a viewer on the image side of the covered transparent area sees the printed image, while a viewer on the other side of the covered transparent area is able to see through the transparent area. In some embodiments, large format sheets are formed from polyvinylchloride. In some embodiments, large format sheets are 1 meter wide and up to about 10 meters wide, though the width is limited only by the ability of the printer to accommodate the width format. The length of large format sheets are not particularly limited; often such sheets are available in roll format and thus length is selected by sizing the image and cutting the length to match the image size.

In some embodiments, substrates usefully printed using the ink compositions described herein are intended to transfer a finished image from the substrate onto a final location; examples of such substrates are iron-on printable substrates for making images on clothing, and "temporary tattoos" or other transfer substrates for transferring an image onto human skin, animals, or onto walls or other items. Nonwoven webs and woven or felted fabrics formed from natural or synthetic fibers can also be printed using the ink compositions described herein. In some embodiments, the substrate is not a sheet or film form, but is a monolithic, three dimensional item; non-sheet materials require a specialized printer, and may require a particular formulated ink in some specialized applications. In embodiments where the UV blocking ink is a 3D printable ink, the substrate is the printing platform or the previous layer of ink.

Inkjet Printing

Inkjet printing is a type of computer printing that creates a digital image by propelling individual droplets of ink onto paper, plastic, or other substrates. Inkjet printers are currently the most commonly used type of printer, and range from small inexpensive consumer models to very large professional machines. Inkjet printing technology includes both drop-on-demand and continuous jet technology; drop-on-demand is by far the more heavily utilized technology and is the nearly exclusive technology available in all but large commercial print shops.

Drop-on-demand printers employ either thermal or piezoelectric print heads to deliver droplets of precise volume through micron-scale nozzles to provide precise placement, usually though not always as the print head moves along a rail, defining a first (x) axis, and the print media moves in a direction 90° to the rail movement, defining a second (y) axis. The image to be printed is encoded in a page description language, and a raster image processor converts the page description into a bitmap in the raster memory. Each horizontal strip of dots across the print substrate is known as a raster line.

Figure 1A:
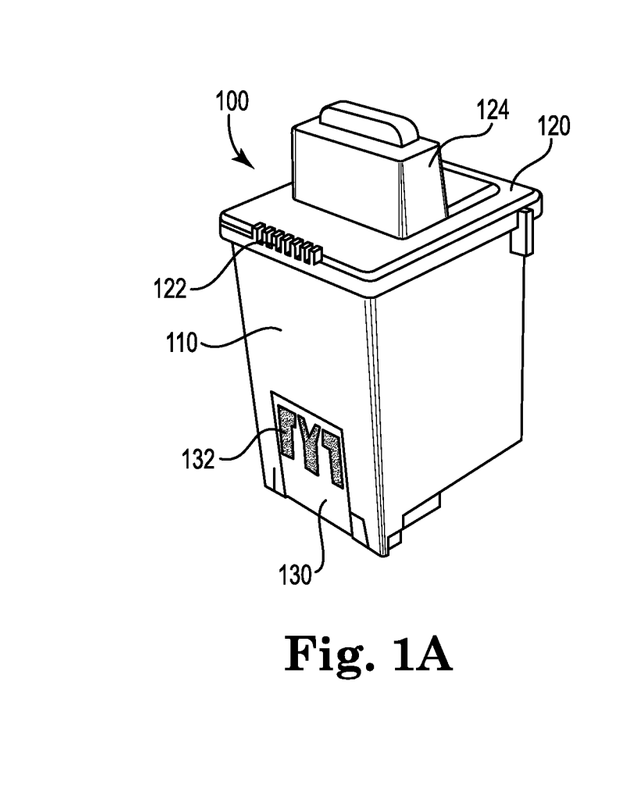
FIGS. 1A-1B show a schematic illustration of an inkjet cartridge for holding and printing a UV blocking ink of the invention.
Figure 1B:
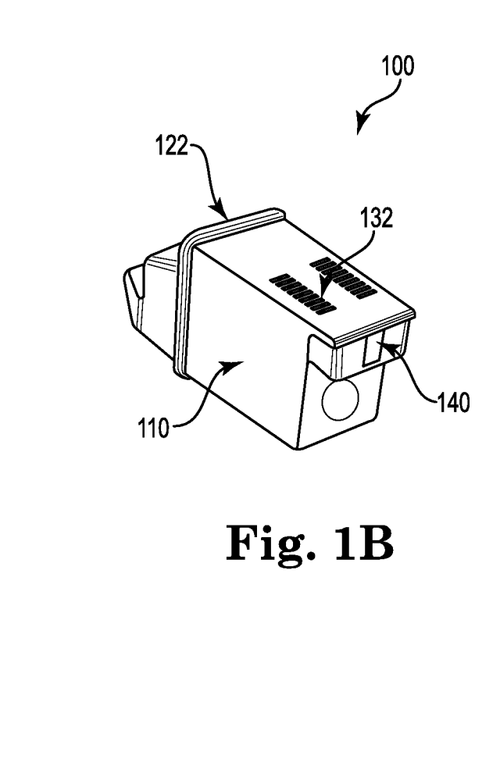
Figure 2:
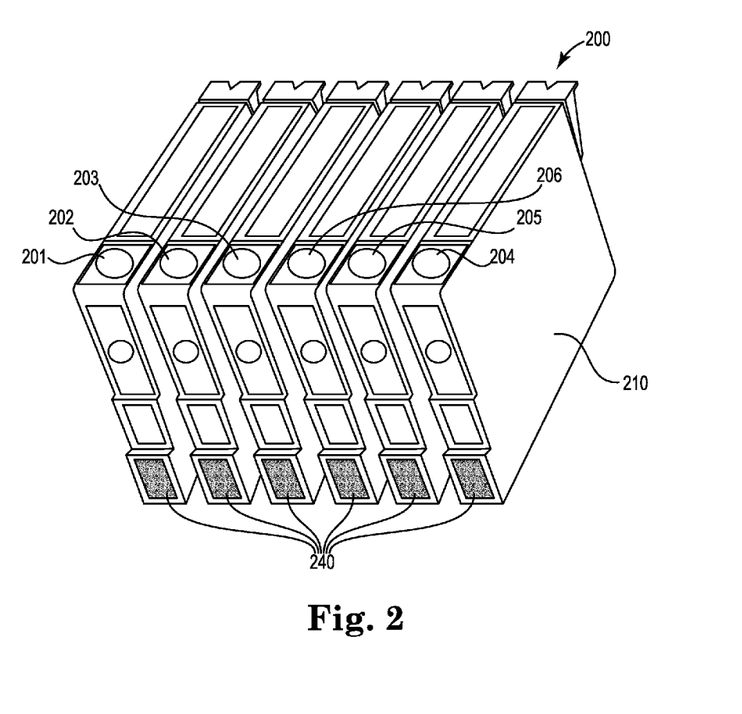
FIG. 2 shows an array of inkjet cartridges wherein one thereof is for holding and printing a UV blocking ink of the invention.

Some drop-on-demand inks are supplied in individual cartridges with small (less than 100 mL) amounts of ink in each cartridge. An example of an individual inkjet cartridge is shown in FIGS. 1A and 1B. Cartridge 100 of FIG. 1A includes a tank area 110 for holding an ink composition, a lid 120 including bracket 122 and attachment means 124, both adapted for affixing the cartridge to the reception area of a printer designed to hold the cartridge, and flex tape 130 bearing copper contacts 132 for providing electrical contact with the printer. FIG. 1B shows cartridge 100 turned on its side to show nozzles 140 for jetting the ink. FIG. 2 shows an array 200 of cartridges 201, 202, 203, 204 205, 206, each having a tank 210 and nozzle area 240. The cartridges 201-206 each have a different ink formulation and are mounted in array 200 on a single drop-on-demand inkjet printer. Cartridge 201 contains a UV blocking inkjet ink as described. One or more of the other cartridges 202-206 contain a visible ink, or a UV ink. Other arrays of cartridges having more or less total cartridges for use in conjunction with a single inkjet printer are envisioned.

Other drop-on-demand printers, particularly large scale and commercial printers, employ bulk ink tanks connected to a print head instead of individual use cartridges such as those shown in FIGS. 1A, 1B, and 2, wherein the bulk ink is replenished by refilling. Continuous inkjet printing employs a constant stream of ink droplets that circulate within the printer, wherein individual droplets are redirected from the main stream and onto a substrate by electrostatic deflection.

Continuous and drop-on-demand printing can employ either water-based inks or solvent-based inks for delivering colorant materials. Drop-on-demand printing can also employ wax-based inks. Most continuous inkjet printing is solvent-based and employs either lower ketones or lower alcohols as the solvent medium. Most drop-on-demand printing employs water-based inks. Thermal inkjet printing further requires a volatile component to provide thermal bubble formation in the print-head and a humectant to prevent crusting of the ink nozzles between uses. In any of these types of inkjet printing, radiation curable components can be provided in the ink, or in the case of piezoelectric printing can form the ink medium itself; typically these radiation curable inks are cured using a selected UV wavelength matched to the activity of an initiator, wherein curing is accomplished after printing. Radiation curable inks are best suited for piezoelectric printers or continuous inkjet printing.

Some inkjet printing involves printing of wax-based inks. Wax-based inks are formulated as solid-state ink blocks (similar in consistency to candle wax or crayons) which are loaded into a system similar to a stapler magazine in the top of the printer. The ink blocks are melted in a heated reservoir (in some embodiments the heated reservoir is maintained between 120° C. and 160° C. during operation) to result in a low viscosity molten ink, and the ink is transferred onto a rotating print drum using a piezo inkjet print head. The substrate then passes over the print drum, at which time the image is transferred, or transfixed, to the page.

An inkjet printable composition as described, that is, a UV blocking inkjet ink, includes at least a UV-A blocking compound and an ink medium, wherein the ink medium is water-based, solvent-based, or wax-based, and optionally further includes one or more radiation curable components and other components suitable for the particular type of ink, as will be appreciated by one of skill. The ink medium and the UV-A blocking compound may be suitable for the selected type of inkjet printer and ink ejection method, in water-based or solvent-based media, in thermal or piezoelectric drop-on-demand inkjet cartridges, in solid-state wax ink blocks, or in bulk ink reservoirs.

The amount of UV-A blocking compound employed in a UV blocking inkjet ink varies depending on the specific UV-A blocking compound employed, as well as the type of printing methodology (continuous vs. drop-on-demand). In some embodiments, the amount of UV-A blocking compound in weight percent based on the total weight of the ink is about $1 \times 10^{-5}$ wt % to 10 wt %, $1 \times 10^{-5}$ wt % to 5 wt %, or about $1 \times 10^{-5}$ wt % to 1 wt %, or about $1 \times 10^{-4}$ wt % to 10 wt %, or about $1 \times 10^{-4}$ wt % to 5 wt %, or about $1 \times 10^{-4}$ wt % to 1 wt %, or about $1 \times 10^{-3}$ wt % to 10 wt %, or about $1 \times 10^{-3}$ wt % to 5 wt %, or about $1 \times 10^{-3}$ wt % to 1 wt %, or about $1 \times 10^{-2}$ wt % to 10 wt %, or about $1 \times 10^{-2}$ wt % to 5 wt %, or about $1 \times 10^{-2}$ wt % to 1 wt %, or about 0.1 wt % to 10 wt %, or about 0.1 wt % to 5 wt %, or about 0.1 wt % to 1 wt %.

Continuous inkjet printable compositions as described include a suitable solvent as the ink medium. Examples of useful solvents include ketones and lower alcohols, such as acetone, methyl ethyl ketone, methyl butyl ketone, methanol, ethanol, isopropanol, butanol, and mixtures thereof that further can include one or more cosolvents, stabilizers, surfactants, lubricants, preservatives, and the like. In some embodiments the solvent is the balance of a UV blocking continuous inkjet ink composition, wherein the solvent and the UV-A blocking compound make up the UV blocking ink. In other embodiments, one or more additives are further added to the UV blocking ink. Such additives include, for example, one or more film forming agents, preservatives, humectants, antifouling agents, biocides, surfactants, stabilizers, curable monomers or crosslinkers, and the like.

Thermal inkjet printable compositions as described include the UV-A blocking compound and at least water, a humectant, and a volatile component as the ink medium. Humectants are additives which maintain a wet environment in the vicinity of the ink jet nozzle, slowing the evaporation process. In some embodiments, useful humectants have a boiling point greater than 150° C., greater than 200° C., or greater than 250° C. In some embodiments, useful humectants have a relative evaporation rate (with n-butyl acetate=1) of less than 1.0, less than 0.9, less than 0.7, less than 0.4, less than 0.1, or less than 0.01. In some embodiments, useful humectants have one or more polar functional groups such as hydroxyl, ether, amide, ester, ketone, and carbonate, for example, two functional groups, which may be the same or different, such as two hydroxyl groups or one hydroxyl group and one ether group. In some such embodiments, the one or more humectants are selected from the group consisting of polyols, glycol ethers, glycol ether acetate, diacetone alcohol, 2-pyrrolidinone, N-methylpyrrolidinone, ethyl lactate, butyl lactate, propylene carbonate, 1,3-dimethyl-2-imidazolidindione, and alkyl esters, and combinations of two or more thereof. The humectants are present in the UV blocking thermal inkjet ink compositions in any amount useful to prevent kogation of the ink nozzles sufficiently to provide for at least 100,000 drops per nozzle before drop weight of the ink composition is reduced by more than 10%, or at least about 500,000 drops, or at least about 1 million drops, or at least about 10 million drops per nozzle before drop weight of the ink composition is reduced by more than 10%. In embodiments, the humectant is present in the UV blocking thermal inkjet ink at about 1 wt % to 70 wt % of the total weight of the ink composition, or about 5 wt % to 50 wt %, or about 10 wt % to 40 wt % of the total weight of the ink composition.

The volatile component of the UV blocking thermal inkjet ink is volatile organic solvent selected from C1-C6 alcohols, C3-C6 ketones, C3-C6 esters, C4-C8 ethers, or mixtures of two or more thereof. The role of the volatile component is to quickly form a bubble during the heating of the inkjet ink, whereupon the bursting of the bubble causes a shock wave that ejects the ink from the nozzle. The volatile component is present in the UV blocking thermal inkjet ink at about 0.1 wt % to 70 wt % of the total weight of the ink composition, or about 1 wt % to 50 wt %, or about 1 wt % to 40 wt %, or about 1 wt % to 40 wt % of the total weight of the ink composition.

In some embodiments, one or more additives are further added to the UV blocking thermal inkjet ink. Useful additives include, for example, one or more film forming agents, waxes, preservatives, biocides, antifouling agents, surfactants, stabilizers, curable monomers or crosslinkers, and the like.

UV blocking wax inkjet inks as described include at least a UV-A blocking compound and a wax as the ink medium. As used herein, the term "wax" means an organic compound or blend of compounds that melt at or above about 45° C. (113° F.), have a dynamic viscosity between about 0.1 cP and 20 cP in the melt, and are insoluble in water and lower ($C_1$-$C_3$) alcohols but soluble in organic, nonpolar solvents. In embodiments, the wax melts between 45° C. and 150° C., or about 60° C. and 140° C.

In some embodiments, the wax is synthetic; in other embodiments, the wax is a plant based wax or an animal based wax. In some embodiments, the wax is derived from biomass, such as a plant based wax, but is then chemically modified, such as by hydrogenation, dimerization, fluorination, and the like. Suitable biomass derived waxes include plant and animal waxes such as beeswax, spermaceti, and lanolin; plant based waxes include carnauba wax, candelilla wax, ouricury wax, sugarcane wax, and retamo wax. Petroleum derived waxes include paraffin wax, montan wax, waxes derived from cracking of polyethylene, microcrystalline wax, Fischer-Tropsch waxes, and waxes derived from specialized catalytic polymerization of ethylene and propylene. In some embodiments, the wax is a blend of various types of compounds; this is most often true of biomass derived waxes. In some embodiments, for example paraffin wax, the wax is a blend of compounds that are chemically similar but are present in a range of molecular weights. In such embodiments, lower melting or higher melting fractions are selected for various applications as determined by the requirements of the printer selected; that is, both melting point and viscosity in the melt are important in various printing equipment. In some embodiments, the plant based wax is a hydrogenated vegetable oil such as coconut oil, corn oil, cottonseed oil, olive oil, palm oil, peanut oil, rapeseed oil, safflower oil, sesame oil, soybean oil, sunflower oil or a combinations of two or more thereof. In some embodiments, the wax is a blend of two or more waxes, wherein the two or more waxes include any of those listed above.

In some embodiments, one or more additives are further added to the UV blocking wax inkjet ink. Useful additives include, for example, one or more film forming agents, preservatives, biocides, antifouling agents, surfactants, stabilizers, UV curable monomers or crosslinkers, and the like.

In some embodiments, the ink composition is a UV blocking actinic radiation curable inkjet ink. In such embodiments, the UV-A blocking inkjet ink medium is formed from materials that are curable (polymerizable, crosslinkable, or both) using actinic radiation. Actinic radiation is generally electron beam or UV radiation. In embodiments, the UV radiation used to cure the ink is UV-B radiation, that is, a photoinitiator is included in the ink composition wherein the photoinitiator is activated by UV-B radiation. Such photoinitiators are well known and any such initiators known to those of skill are useful herein as components of the UV blocking actinic radiation curable inkjet inks as described, and are used in conventional amounts that are typically 1 wt % or less of the total weight of the ink composition. Such inks do not include solvents or water, and are "dried" by curing the composition. Such actinic radiation curable inks are almost exclusively employed in conjunction with piezoelectric inkjet systems. In embodiments, monomers useful in forming the UV blocking actinic radiation curable inkjet inks include any of the known compounds having one or more unsaturated bonds that are polymerizable by free radical polymerization methods or plasma polymerization methods such as electron beam radiation. In embodiments, useful vinyl monomers include acrylates, methacrylates, acrylamides, allylic monomers, α-olefins, butadiene, styrene and styrene derivatives, acrylonitrile, and the like. Some examples of useful monomers include acrylic acid, methacrylic acid, and alkyl esters of acrylic or methacrylic acid wherein the ester groups have between 1 and 18 carbons and are linear, branched, or cyclic. In embodiments, blends of two or more monomers are employed in the UV blocking actinic radiation curable inkjet inks. In some such embodiments, one or more monomers are selected for improved wetting, adhesion, or both of the ink to the target substrate.

In some embodiments, monomers having more than one unsaturated and polymerizable bond are employed in the UV blocking actinic radiation curable inkjet inks, for example diacrylates such as ethylene glycol diacrylate, hexanedol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. In some such embodiments, a monomer having more than one unsaturated and polymerizable bond is present at less than about 10 wt % of the weight of the UV blocking actinic radiation curable inkjet inks, for example at about 0.1 wt % to 5 wt % or about 0.5 wt % to 2 wt % of the total weight of the UV blocking actinic radiation curable inkjet inks.

In some embodiments, one or more additives are further added to UV blocking actinic radiation curable inkjet inks. Useful additives include, for example, one or more film forming agents, preservatives, biocides, antifouling agents, surfactants, stabilizers, and the like.

Where a UV blocking actinic radiation curable inkjet ink is employed, it is necessary to cure the curable components thereof after printing. The wavelength and intensity of radiation employed to cure printed layers of UV blocking actinic radiation curable inkjet inks is based on the specific photoinitiator employed. One of skill in the art will appreciate that curing methodology will be determined for each UV blocking actinic radiation curable inkjet ink by routine optimization based on the known art of curing curable inkjet inks using actinic radiation.

One method as described herein includes printing a UV blocking ink from an inkjet printer in a computer generated pattern of droplets onto a substrate, wherein the droplets are further printed on top of at least a portion of a UV ink droplet previously deposited on the substrate. In these embodiments, the previously deposited UV ink droplet is a portion of an UV-A fluorescent inkjet image. In some such embodiments, the UV blocking ink is deposited on the substrate on the same raster line as the UV ink; in some such embodiments one or more UV ink droplets mix with one or more UV blocking ink droplets prior to ink absorption, adsorption, drying, solidification, cure, or a combination thereof. In other embodiments, the UV blocking ink droplets deliver the UV-A blocking compound to the at least partially cover a UV ink on the substrate, wherein the UV ink medium is already absorbed, adsorbed, dried, solidified, or cured on the selected substrate prior to contact with the UV blocking ink.

Figure 3A:
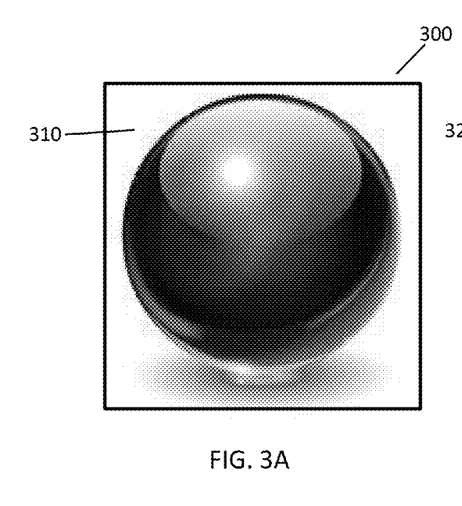
FIGS. 3A-3B show an image generated using a UV blocking ink of the invention.
Figure 3B:
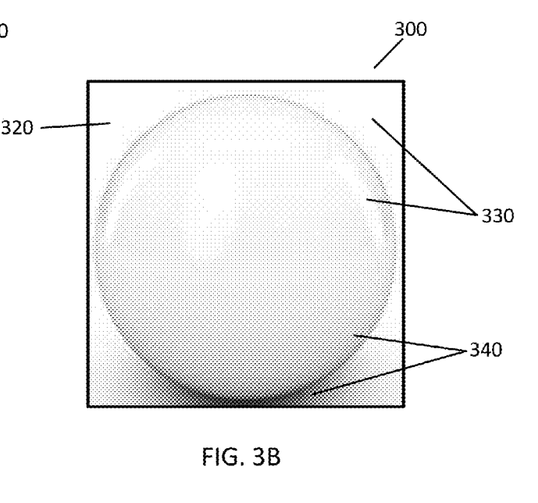

FIGS. 3A and 3B show one embodiment of an image printed using the method wherein a UV blocking ink is printed on top of a UV ink image previously deposited on the substrate, wherein the UV ink and the UV blocking ink form a UV-A visible image, and the UV-A visible image is further printed on a visible ink image; such images are referred to as composite images. FIG. 3A shows composite image 300 illuminated by white light, wherein the visible ink image 310 is visible. No fluorescent image is visible in the white light illumination. FIG. 3B shows the same composite image 300 illuminated by UV-A radiation in the absence of white light, wherein UV visible image 320 is visible. UV image 320 has areas 330 where no UV blocking ink is printed thereon, and areas 340 having UV blocking ink printed thereon. Areas 340 are shaded over a full range of luminosity, manifested in the drawing as grayscale shading.

Another method as described includes printing the UV blocking ink from an inkjet printer in a computer generated pattern of droplets, wherein the droplets are deposited on top of a substrate that is UV-A fluorescent. In such embodiments the UV blocking inks are used as standalone inks that usefully form monochromatic images on a solid or monolithic UV-A fluorescent substrate or a substrate that has been covered, for example, over the entirety of the printable surface with a single UV-A fluorescent material or single blend of UV-A fluorescent materials. Thus, in such embodiments, prior to printing the UV blocking ink the substrate shows up as a solid, monolithic item when illuminated by UV-A radiation; and upon printing the UV blocking ink onto the substrate, the substrate includes an image that is invisible when illuminated by white light and becomes visible when illuminated by UV-A radiation. This method is particularly effective where employed with substrates that contain, or are coated with, one or more visible UV colorants, that is, colorants that are visible both when illuminated by white light and fluoresce when illuminated by UV-A light. The effect is to see a plain, single color substrate or substrate surface in white light, and a fluorescent color having a monochromatic image when illuminated by UV-A light. The monochromatic image has, in various embodiments, a full range of luminosity analogous to a grayscale image in conventional white-light photography or printing methodology.

Figure 4A:
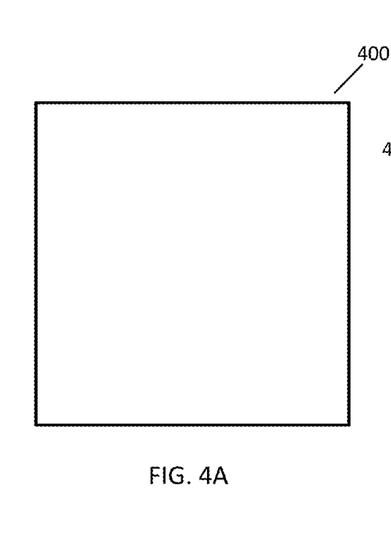
FIGS. 4A-4B show another image generated using a UV blocking ink of the invention.
Figure 4B:
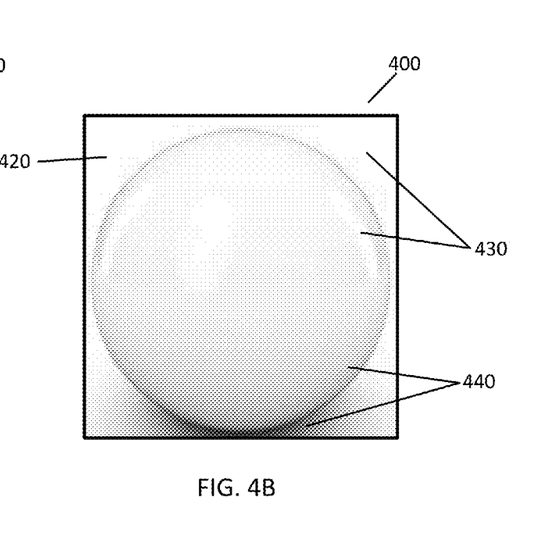

FIGS. 4A and 4B show one embodiment of an image printed using the method wherein the UV blocking ink from an inkjet printer is deposited on top of a substrate wherein the entire substrate surface is UV-A fluorescent, forming a monochromatic image that appears when illuminated by UV-A radiation. FIG. 4A shows image 400 illuminated by white light, wherein no printed image is visible. FIG. 4B shows the same image 400 illuminated by UV-A radiation, wherein image 420 is visible. UV image 420 has areas 430 where no UV blocking ink is printed thereon, and areas 440 having UV blocking ink printed thereon. Areas 440 are shaded over a full range of luminosity, manifested in the drawing as grayscale shading.

Figure 5:
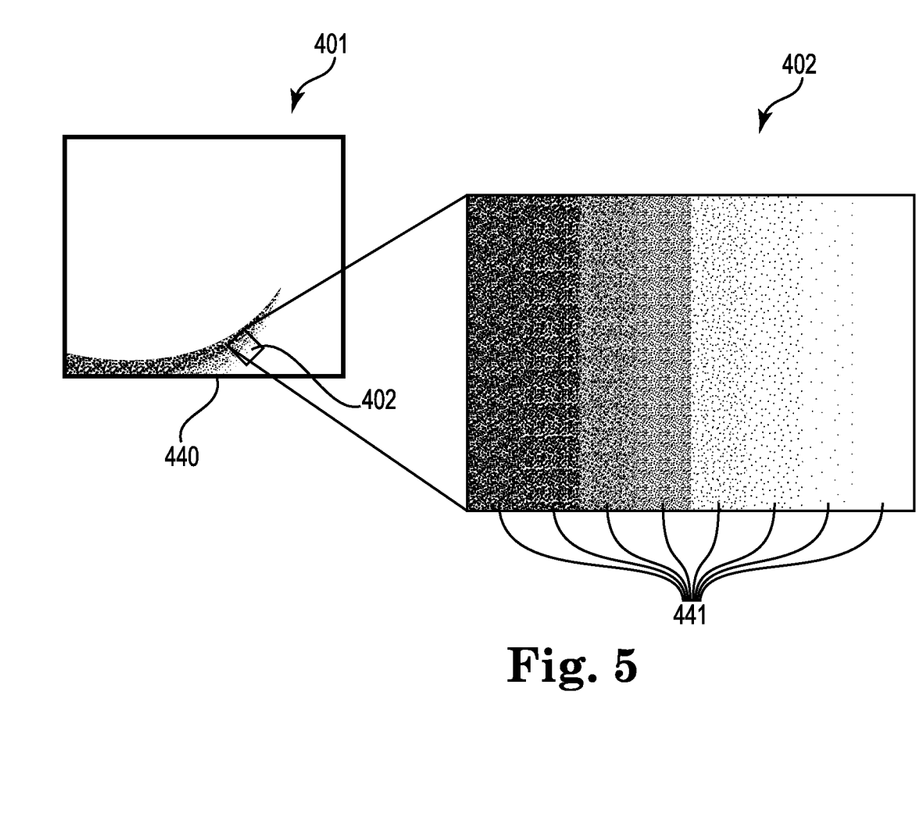
FIG. 5 is a magnified section of the image of FIG. 4B.

FIG. 5 shows a section 401 of the image 400 shown in FIG. 4B. Shaded area 440 is shown, wherein a magnified area 402 is provided to show further detail. On a microscopic scale, the rastered image and droplet pattern 441 of the UV blocking ink is apparent.

The UV blocking inks as described are usefully employed with any suitable type of inkjet printer, wherein the UV blocking ink is deposited on a UV-A fluorescent image as an over-printed pattern or on a UV-A fluorescent substrate to create a monochromatic image visible when illuminated by UV-A light.

Flexographic Printing

Flexography is a form of relief printing wherein a liquid ink is applied to an elastomeric surface, called a plate, on which the image is raised above the rest of the surface as a 3D positive relief. It is a web-based, continuous process that employs a series of cylinders, or rolls, to transfer ink to a substrate. In a typical flexographic process, a flexographic ink is applied in a uniform layer to the raised portions of the flexographic plate mounted on a cylinder, or roll, via an ink metering cylinder, called an anilox roll, and the ink is then transferred from the flexographic plate onto a continuously moving substrate via a series of rolls. The inks typically employed are solvent based or radiation curable, though waterbased inks have been developed for flexographic printing. A wax-based ink can also be employed if the flexographic printer is equipped with a heated vessel for holding the ink.

A feature of flexographic printing is that the technique lends itself to application of multiple layers. While only one ink can be applied per flexographic plate for example, three, four, or more plate printing combinations are easily built into flexographic lines in serial fashion in order to build full color images in a single pass over the web length. Flexographic printing offers the advantage of high speed, up to 2000 ft/min (about 610 meter/min) with high precision.

The UV blocking flexographic inks as described include at least a UV-A blocking compound and a flexographic ink medium. The ink medium may have a viscosity of about 40 cP or less at the delivery temperature. In some embodiments, the ink medium has a kinematic viscosity of equal to or less than about 30 cP at 100° C. In some embodiments, ink media are generally of the same composition as the inkjet inks discussed above, although the proportions of ingredients are broader due to the fact that the ink is not "jetted" out of a micron-scale nozzle. Thus, for example, a solvent based flexographic ink can contain more film-forming polymer resin than an inkjet ink; resins present a problem for jetting through the micron scale nozzles due to viscoelasticity. Such properties are not as much of a problem for flexography. UV curable flexographic inks can thus include prepolymers and resins as well, which help the ink to stay in place prior to cure. As long as the ink medium has a sufficient viscosity, such as about 40 cP or less at the delivery temperature, the UV blocking inks as described are usefully employed as UV blocking flexographic inks.

Thus, one method as described includes printing a UV blocking flexographic ink using flexographic printing, wherein the printing plate bearing the UV blocking flexographic ink is further printed on top of at least a portion of a UV flexographic ink image on the substrate. In some such embodiments, UV flexographic ink droplets mix with one or more UV blocking flexographic ink droplets prior to ink absorption, adsorption, drying, solidification, cure, or a combination thereof on the substrate. In other embodiments, the UV blocking flexographic ink delivers the UV-A blocking compound to be adjacent to or at least partially cover a UV flexographic ink on the substrate, wherein the UV flexographic ink medium is already absorbed, adsorbed, dried, solidified, or cured on the selected substrate prior to contact with the UV blocking flexographic ink.

Another method described includes printing the UV blocking flexographic ink using a flexographic printer wherein the image is deposited on top of a substrate that is UV-A fluorescent. In such embodiments the UV blocking flexographic inks are used as standalone inks that usefully form monochromatic images on a solid or monolithic UV-A fluorescent substrate or a substrate that has been painted, for example, with a UV-A fluorescent paint, to form an image that is invisible when illuminated by white light and becomes visible when illuminated by UV-A light. This method is particularly effective where employed with substrates that are, or are coated with, visible UV colorants, that is, colorants that are visible both when illuminated by white light and fluoresce when illuminated by UV-A light. The effect is to see a colored plain, single color substrate in white light, and a fluorescent monochromatic image with a full range of luminosity when illuminated by UV-A light.

A wide range of print substrates are conveniently and easily addressed by flexographic printing. The substrates printable using flexographic printing techniques to print the UV blocking flexographic inks as described are not particularly limited. Examples of substrates commonly printed include coated and uncoated paper, paperboard, and corrugated board, foils and metallized films or papers, and a wide range of thermoplastic films such as polyethylene, polypropylene, polyester, and nylon films, and the like. Nonwoven webs and woven or felted fabrics formed from natural or synthetic fibers can also be printed.

Thermal Transfer Printing

Thermal wax transfer printing technology can be used to produce color images by adhering a wax-based ink onto paper. As the paper and ribbon travel in unison beneath the thermal print head, the wax-based ink from the transfer ribbon melts onto the paper. When cooled, the wax is permanently adhered to the paper. This type of thermal printer uses one panel of ribbon for each ink and each page to be printed, regardless of the contents of the page. Current thermal transfer printers do not vary the dot intensity, which means that images are dithered. Currently, this type of printer is employed primarily for industrial label printing. These printers are considered highly reliable due to their small number of moving parts.

The UV blocking thermal transfer wax inks as described include the same components, in some embodiments, as the UV blocking wax inkjet inks described above. The thermal wax transfer printing methods described above are usefully employed with a UV blocking thermal transfer wax ink as described.

Thus, one method as described includes printing a UV blocking thermal transfer wax ink using thermal transfer printing, wherein the UV blocking thermal transfer wax ink is printed on top of at least a portion of a UV thermal transfer ink image on the substrate.

Another method as described, includes printing the UV blocking thermal transfer wax ink using a thermal transfer printer wherein the image is deposited on top of a substrate that is UV-A fluorescent. In such embodiments the UV blocking thermal transfer wax ink forms a monochromatic image on a solid or monolithic UV-A fluorescent substrate or a substrate that has been painted, for example, with a UV-A fluorescent paint, to form an image that is invisible when illuminated by white light and becomes visible when illuminated by UV-A light. This method is particularly effective where employed with substrates that are, or are coated with, visible UV dyes or pigments, that is, dyes or pigments that are visible both when illuminated by white light and fluoresce when illuminated by UV-A light. The effect is to see a colored plain substrate in white light, and a fluorescent color having a monochromatic image when illuminated by UV-A light.

Dye Sublimation Printing

Dye sublimation is a printing process that uses heat to transfer dye onto materials such as a plastic, card, paper, or fabric. Many consumer and professional dye-sublimation printers are designed and used for producing photographic prints, ID cards, etc. Dye sublimation is also used, in some embodiments, to transfer a UV-A blocking compound onto the selected substrate.

The most common dye sublimation process lays one color at a time, the dye being stored on a polyester ribbon that has each color on a separate panel. Each colored panel is the size of the medium that is being printed. During the printing cycle, the printer rollers will move the medium and one of the colored panels together under a thermal printing head, which is usually the same width as the shorter dimension of the print medium. Tiny heating elements on the head change temperature rapidly, transferring different amounts of dye depending on the amount of heat applied. After being heated into a gas, the dye diffuses onto the printing medium and solidifies. After the printer finishes covering the medium in one color, it winds the ribbon on to the next color panel to prepare for the next cycle.

The entire process is repeated as many times as there are ribbons to employ in forming the print. It is common to deposit a clear laminate as a last layer over the printed image, wherein the clear layer is also deposited by dye sublimation printing. This layer protects the dyes from abrasion, from degrading, or from resublimating when handled or exposed to warm conditions. Dye sublimation has the advantage of being a continuous-tone technology, where each dot can be any color. Traditionally this has provided an advantage for dye sublimation in terms of image quality. In the current application, the UV-A blocking compound is deposited by dye sublimation, in some embodiments along with one or more compounds designed to affix the UV-A blocking compound to the substrate. In some embodiments, a clear laminate is also printed over the UV-A blocking layer, such that the UV-A blocking compound is protected from degradation, abrasion, and re-heating.

Thus, one method as described includes printing a UV-A blocking compound using dye sublimation printing, wherein the UV-A blocking compound is printed on top of at least a portion of a UV-A fluorescent dye image on the substrate. In some such embodiments, the UV-A blocking compound is itself the ink and is stored on a polyester ribbon; in some such embodiments, one or more additives are further present in the polyester ribbon, such as additives to fix the UV-A blocking compound on the substrate, to stabilize the UV-A blocking compound thermally, and the like. In some such embodiments, the polyester ribbon containing the UV-A blocking compound is employed in the last sublimation cycle. In other such embodiments, the UV-A blocking compound is employed in the sublimation cycle immediately preceding the printing of the laminate layer.

Another method as described, includes printing the UV-A blocking compound using a dye sublimation printer wherein the UV-A blocking compound is deposited on top of a substrate that is UV-A fluorescent. In such embodiments the UV-A blocking compound is used as standalone "ink" to form a monochromatic image on a solid or monolithic UV-A fluorescent substrate or a substrate that has been painted, for example, with a UV-A fluorescent paint, wherein the image is invisible when illuminated by white light and becomes visible when illuminated by UV-A light. This method is particularly effective where employed with substrates that are, or are coated with, visible UV dyes or pigments, that is, dyes or pigments that are visible both when illuminated by white light and fluoresce when illuminated by UV-A light. The effect is to see a colored plain substrate in white light, and a fluorescent color having a monochromatic image when illuminated by UV-A light.

3D Printing

Additive manufacturing, or 3D printing, is a process of making a three-dimensional solid object of virtually any shape employing digital technology. 3D printing is achieved using an additive process, wherein successive layers of material are laid down in a pattern employing a "materials printer" that prints a molten thermoplastic. Additive manufacturing is distinct from traditional machining techniques, which rely on subtractive processes such as cutting or drilling.

A variety of three-dimensional fabrication techniques have been devised for fabrication of objects such as machine parts, medical device parts, jewelry and art articles, footwear, toys, scaled architectural models, and the like. Additionally, mass customization of objects is possible, for example printing of customized cell phone covers.

Figure 6:
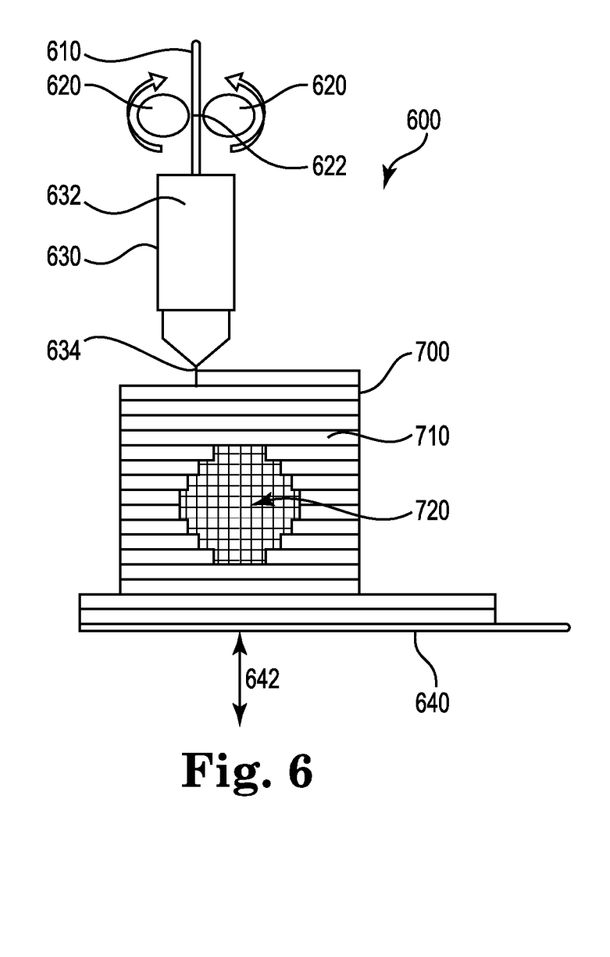
FIG. 6 is a schematic illustration of a 3D printer and a printed 3D article including a UV blocking ink of the invention.

The fused filament method of 3D printing is schematically represented in FIG. 6. In the systems that utilize fused filament deposition or fused filament fabrication technology the 3D printing process employs a thermoplastic polymer filament 610 as feedstock through feed rollers 620 that define feed gap 622 and into a delivery head 630 having heated liquefier 632 and nozzle 634. Heated liquefier 632 heats filament 610 and extrudes the filament from nozzle 634 in a molten or semi-molten state such that the material flows freely through the nozzle 634. The motion of delivery head 630 is computer-controlled. Typically, delivery head 630 is mounted movably on a bar wherein delivery head 630 moves side-to-side, defining an x direction. In some embodiments, delivery head 630 moves side-to-side as it traverses a bar, and the bar carrying delivery head 630 moves back-and-forth, defining a y direction. When the material reaches platform 640, it cools and hardens. In some embodiments, platform 640 moves back-and-forth, defining a y direction, instead of the bar carrying delivery head 630. Once a layer is complete with in the x,y plane, platform 640 is lowered one layer-thickness in z-direction 642, and deposition of the next layer begins. In this manner, a 3D article 700 is formed. In some embodiments, 3D printer 600 has more than one delivery head 630, wherein filaments of various colors or having various properties are delivered. For example, in some embodiments, a secondary sacrificial material, or support material, is also deposited (and later removed, for example by dissolving in water) in order to support the construction of overhanging geometries. The sacrificial polymer is typically printed by a second delivery head. Such 3D printing configurations can also be advantageously used, for example to employ a first filament having a white-light visible UV colorant, and a second filament that includes both the white-light visible UV colorant and a UV-A blocking compound. Article 700 is shown with both a first filament 710 having a white-light visible UV colorant and a second filament 720 that includes both the white-light visible UV colorant and a UV-A blocking compound. The combined filaments form article 700. Delivery head 630 continues to form the remaining image from first filament 710, while second filament 720 is present at the center of the 3D article 700. When illuminated by white light, the article 700 will appear to have a single solid color throughout. When illuminated by UV-A radiation, article 700 will appear as a fluorescent article with a dark center. Other variations of filament ink types and image manipulations will be easily envisioned by one of skill.

Laser Printing

Laser printing is an electrostatic digital printing process that produces an image by passing a laser beam over a charged drum to define a differentially charged image. The drum then selectively collects charged toner, and then transfers the image to the substrate, which is then heated to permanently fix the image. The toner typically includes at least one or more thermoplastic resins and a colorant. In some embodiments as described, a UV blocking ink is a UV blocking laser toner, wherein one or more UV-A blocking compounds are incorporated into a toner composition that is either visible or invisible when illuminated by white light. Thus, the UV blocking laser toners as described include at least a UV-A blocking compound and a thermoplastic suitable for use in laser toner compositions. Suitable thermoplastics useful in the UV blocking laser toners as described include styrene acrylate copolymers, styrene butadiene copolymers, and various polyester resins. In some embodiments, the UV blocking laser toners have a particle size of around 5 to 25 microns, or about 6 to 20 microns, or about 8 to 15 microns, or about 8 to 10 microns.

One method as described includes printing a UV blocking laser toner in a computer generated pattern onto a substrate, wherein the substrate includes a UV-A fluorescent material. In some such embodiments, the substrate is covered on the surface thereof with a single UV-A fluorescent material, or a single combination of UV-A fluorescent materials. In such embodiments, the image formed using the UV blocking laser toner is a monochromatic image with a full range of luminosity when illuminated by UV-A radiation.

Computer

Figure 7:
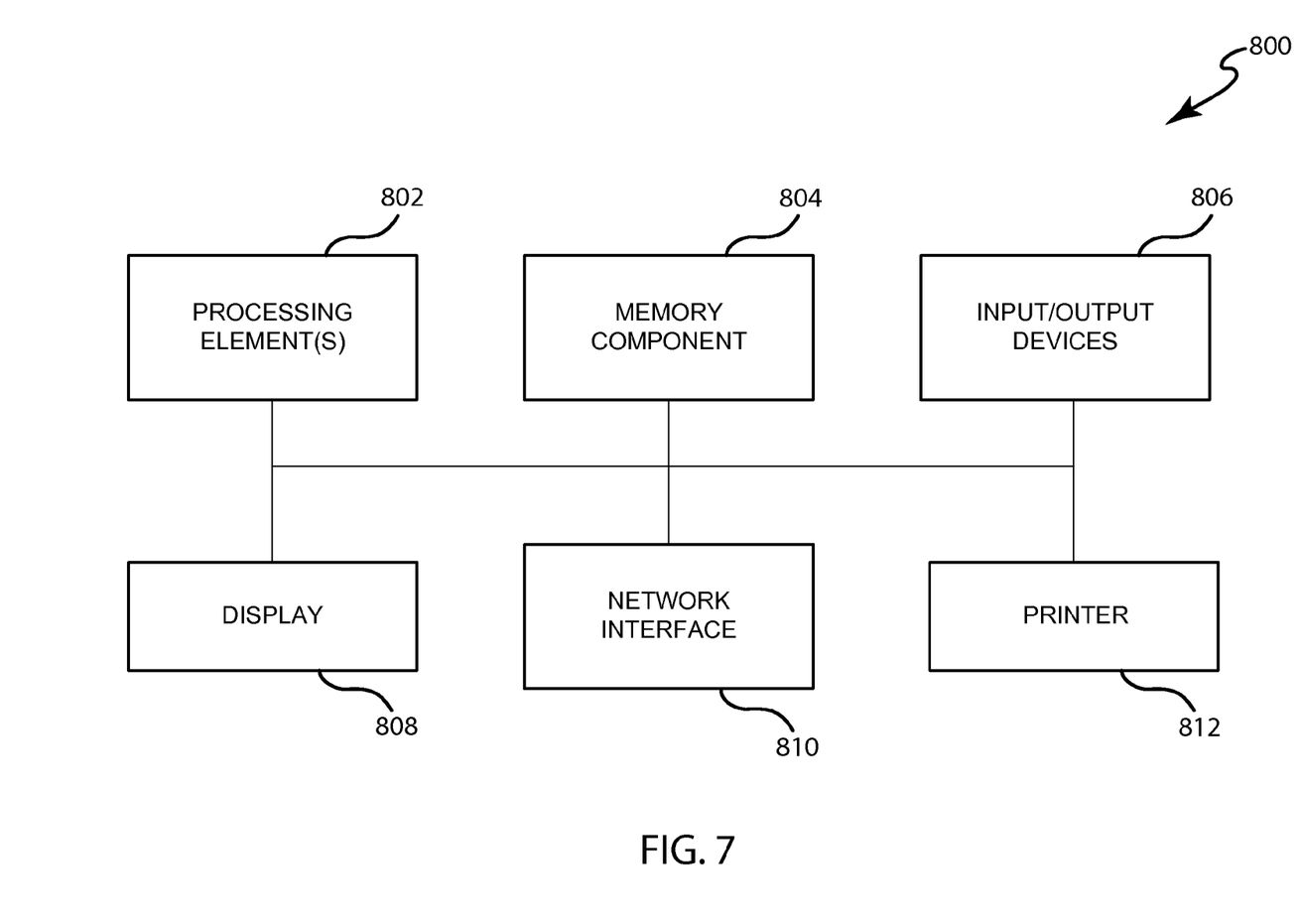
FIG. 7 is a simplified block diagram of a computer in communication with a printer.

One of more of the printer examples described herein may be in communication with one or more computers. FIG. 7 is a simplified block diagram of a computing device that may be used in conjunction with the one or more printers described herein. With reference to FIG. 7, the computer 800 may include one or more processing elements 802, one or more memory components 804, one or more input/output devices 806, a display 808, and/or a network interface 810. Each of the elements of the computer 800 may be in communication with one another or may be in communication with select elements, such as the processing element 802, and not in communication with other elements.

Additionally, the computer 800 may be integrated with select components and may be physically separated from others but be in communication therewith through a network (e.g., WiFi, Internet, Bluetooth, Ethernet, Universal Serial Bus, or the like) or other communication mechanism. For example, the display 808 may be physically separated from the computer 800 but be in communication with the processing elements 802 and other components of the computer 800. Similarly, the computer 800 may be in communication with the printer 812, which may be similar to the 3D and 2D printers disclosed herein.

With continued reference to FIG. 7, the one or more processing elements 802 may be substantially any device capable of processing, receiving, and/or transmitting instructions. For example, the one or more processing elements 802 may be a microprocessor or microcomputer. Additionally, it should be noted that in some embodiments select components of the computer 800 may be controlled by a first processor and other components of the computer 800 may be controlled by a second processor where the first and second processors may or may not be in communication with one another.

The one or more memory components 804 store electronic data that may be utilized by the computer 800. For example, the memory component 804 may store electrical data or content, such as or one or more audio files, video files, document files, and so on, corresponding to various applications. The memory component 804 may be, for example, non-volatile storage, a magnetic storage medium, optical storage medium, read only memory, random access memory, erasable programmable memory, or flash memory.

The network interface 810 facilities communication between the computer 800, one or more printers 812, as well as other electronic devices (e.g., other computers). For example, the network interface 810 may receive data from one or more electronic components or devices, as well as facilitate transmission of data to one or more electronic components or devices. The network interface 810 may be used to receive data from a network, or may be used to send and transmit electronic signals via a wireless or wired connection (Internet, WiFi, Bluetooth, and Ethernet being a few examples). In some embodiments the network interface 810 may support multiple network or communication mechanisms. For example, the network interface 810 may pair with another device over a Bluetooth network to transfer signals to the other device while simultaneously receiving data from a WiFi or other network.

The display 808 may be integrated with the computer 800, such as a tablet computer, or may be separate from the computer 800, such as a stand-alone monitor. The display 808 displays one or more output images and/or videos and is used to provide output to a user. The display 808 may be substantially any type of display screen such as a liquid crystal display, plasma display, light emitting diode screen, or the like. Additionally, in some embodiments the display 808 may include one or more input components. For example, the display 808 may include one or more sensors to detect input signals as a user touches the display 808 either through a finger or an input device such as a stylus.

The input/output devices 806 are used to provide input to the computer 800. For example, the input/output devices 806 may include a keyboard, a mouse, a joystick, stylus, track pad, handheld controller, or the like. Additionally, the input/output devices 806 may include one or more sensors, such as image sensors, capacitive sensors, or the like. The input/output devices 806 are in communication with the display 808 and the processing elements 802 and enable a user to provide input to the computer 800.

The printable composition, image formed by the printable composition, and the method of forming the image, as variously disclosed herein may be suitably practiced in the absence of any element which is not specifically disclosed herein; and is susceptible to various modifications and alternative forms, specifics thereof have been described in detail. It should be understood, however, that the disclosure herein is not limited to the particular embodiments described. On the contrary, the intention is to cover modifications, equivalents, and alternatives falling within the spirit and scope as described. In various embodiments, the invention suitably comprises, consists essentially of, or consists of the elements described herein and claimed according to the claims.

What is claimed is:

1. A printable composition comprising a UV blocking compound, wherein the composition contains substantially no colorants visible under white light, and substantially no colorants that fluoresce when irradiated by UV light having a range of wavelengths that correspond to at least a portion of a range of wavelengths blocked by the UV blocking compound, wherein the printable composition is a UV curable ink, a wax-based ink, a laser toner, a 3D printer filament, or a dye sublimation ink.

2. The printable composition of claim 1 wherein the UV blocking compound is a UV-A blocking compound.

3. The printable composition of claim 1 wherein the UV blocking compound comprises avobenzone, bis-ethylhexyloxyphenol methoxyphenyl triazine, methylene bis-benzotriazolyl tetramethylbutylphenol, terephthalylidene dicamphor sulfonic acid, drometrizole trisiloxane, hexyl 2-[4-(diethylamino)-2-hydroxybenzoyl]benzoate, ethylhexyl methoxycinnamate, p-aminobenzoic acid, 2-ethylhexyl 4-(dimethylamino)benzoate, phenylbenzimidazole sulfonic acid, a derivative of hydroxyphenylbenzotriazole, hydroxybenzophenone, cinnamic acid, salicyclic acid, hydroxyphenyl-s-triazine, or axalanilide; a microparticle or nanoparticle comprising titanium dioxide, silicon dioxide, or zinc oxide, or a blend of two or more thereof.

4. An image comprising a selected pattern of UV blocking ink on a substrate surface, the substrate surface comprising one or more UV fluorescent materials on at least a portion thereof, wherein the UV blocking ink is disposed on the UV fluorescent materials;

the UV blocking ink comprising a UV blocking compound, substantially no colorants visible under white light, and substantially no colorants that fluoresce when irradiated by UV light having a range of wavelengths that correspond to at least a portion of a range of wavelengths blocked by the UV blocking compound;

the UV fluorescent materials exhibit fluorescence when irradiated by UV light having a range of wavelengths that correspond to at least a portion of the range of wavelengths blocked by the UV blocking compound;

the selected pattern of UV blocking ink is applied such that variable amounts of UV blocking ink are disposed on the UV fluorescent material such that when the image is illuminated by UV light having a range of wavelengths that correspond to at least a portion of the rage of wavelengths blocked by the UV blocking compound, the image exhibits one or more of fading, shadows, or an illusion of depth on the one or more UV fluorescent materials.

5. The image of claim 4 wherein one or more visible inks are further printed on the substrate surface.

6. The image of claim 4 wherein the one or more UV fluorescent materials are one or more UV inks printed on the substrate surface.

7. The image of claim 6 wherein the UV inks are visible UV inks.

8. The image of claim 4 wherein the substrate comprises a sheet or film comprising paper, a thermoplastic polymer, or a combination thereof.

9. The image of claim 8 wherein the substrate is employed as a mural, a poster, a vehicle wrap, or as part of an amusement park ride.

10. The image of claim 4 wherein the UV blocking compound is a UV-A blocking compound.

11. The image of claim 4 wherein the UV blocking compound is UV blocking compound comprises avobenzone, bis-ethylhexyloxyphenol methoxyphenyl triazine, methylene bis-benzotriazolyl tetramethylbutylphenol, terephthalylidene dicamphor sulfonic acid, drometrizole trisiloxane, hexyl 2-[4-(diethylamino)-2-hydroxybenzoyl] benzoate, ethylhexyl methoxycinnamate, p-aminobenzoic acid, 2-ethylhexyl 4-(dimethylamino)benzoate, phenylbenzimidazole sulfonic acid, a derivative of hydroxyphenylbenzotriazole, hydroxybenzophenone, cinnamic acid, salicyclic acid, hydroxyphenyl-s-triazine, or axalanilide, a microparticle or nanoparticle comprising titanium dioxide, silicon dioxide, or zinc oxide, or a blend of two or more thereof.

12. The image of claim 4 wherein the UV fluorescent materials fluoresce when irradiated by UV-A light.

13. The image of claim 4 wherein the UV blocking compound is a UV-A blocking compound and the UV fluorescent materials fluoresce when irradiated by UV-A light.

* * * * *